United States Patent
Hugi

(10) Patent No.: US 10,150,278 B2
(45) Date of Patent: Dec. 11, 2018

(54) SYSTEM AND METHOD FOR SEALING OPEN ENDS OF MULTI-WALL SHEETS

(71) Applicant: Palram Industries (1990) Ltd., Kibbutz Ramat Yohanan (IL)

(72) Inventor: Reuven Hugi, Nahariya (IL)

(73) Assignee: PALRAM INDUSTRIES (1990) LTD, Kibbutz Ramat Yohanan (IL)

(*) Notice: Subject to any disclaimer, the term of this patent is extended or adjusted under 35 U.S.C. 154(b) by 101 days.

(21) Appl. No.: 14/145,944

(22) Filed: Jan. 1, 2014

(65) Prior Publication Data

US 2015/0034239 A1 Feb. 5, 2015

Related U.S. Application Data

(60) Provisional application No. 61/748,136, filed on Jan. 2, 2013.

(51) Int. Cl.
*B32B 38/00* (2006.01)
*B32B 37/06* (2006.01)
(Continued)

(52) U.S. Cl.
CPC ...... *B32B 38/0004* (2013.01); *B32B 37/0046* (2013.01); *B32B 37/0076* (2013.01);
(Continued)

(58) Field of Classification Search
CPC .......... Y10T 156/108; Y10T 156/1085; Y10T 156/1348; Y10T 156/1365; Y10T 156/1374; Y10T 156/1788; Y10T 156/1795; B32B 2607/02; B32B 37/06; B32B 37/1027; B32B 37/146; B32B 37/18; B32B 2037/1223; B32B 2037/1253; B32B 38/0004; B32B 38/0036; B32B 38/105; B32B 2038/0076; B32B 2038/045
(Continued)

(56) References Cited

U.S. PATENT DOCUMENTS

| | | |
|---|---|---|
| 2,788,852 A | 4/1957 | Sharpe |
| 3,038,982 A | 6/1962 | Ludlow |

(Continued)

FOREIGN PATENT DOCUMENTS

| | | |
|---|---|---|
| WO | WO 96/24549 | 8/1996 |
| WO | WO 02/36899 | 5/2002 |

OTHER PUBLICATIONS

Aldren A. Watson, Hand Bookbinding A Manual of Instruction, 1996, 13 pages.*

(Continued)

*Primary Examiner* — Linda L Gray
(74) *Attorney, Agent, or Firm* — Pearl Cohen Zedek Latzer Baratz LLP

(57) ABSTRACT

A device and a method allow for adhering sealing tape to open end of a multilayer sheet, usable at the production line and at the installation site. The device comprise means for applying pressure and heat onto the sealing tape and cutting blades for removing protruding edges of the sealing tape after it was adhered. The method comprise providing of a sealing tape, attaching and adhering the sealing tape to an open end of a multi-wall sheet by means of heat and/or pressure and adhesive and removal of protruding edges using cutting blades.

6 Claims, 9 Drawing Sheets

(51) Int. Cl.
   *E04C 2/54*    (2006.01)
   *B32B 37/00*   (2006.01)
   *B32B 37/12*   (2006.01)
   *B32B 37/18*   (2006.01)
   *B65H 35/00*   (2006.01)
   *B65H 35/02*   (2006.01)
   *B32B 37/14*   (2006.01)

(52) U.S. Cl.
   CPC .......... *B32B 37/1284* (2013.01); *B32B 37/18* (2013.01); *B65H 35/0033* (2013.01); *B65H 35/02* (2013.01); *E04C 2/543* (2013.01); *B32B 37/06* (2013.01); *B32B 37/146* (2013.01); *B32B 38/0036* (2013.01); *B32B 38/105* (2013.01); *B32B 2310/0454* (2013.01); *B32B 2310/0806* (2013.01); *B32B 2419/00* (2013.01); *B65H 2301/5143* (2013.01); *B65H 2701/131* (2013.01); *Y10T 156/108* (2015.01); *Y10T 156/1085* (2015.01); *Y10T 156/12* (2015.01); *Y10T 156/1348* (2015.01); *Y10T 156/1365* (2015.01); *Y10T 156/1374* (2015.01); *Y10T 156/1788* (2015.01); *Y10T 156/1795* (2015.01)

(58) Field of Classification Search
   USPC ........................................................ 156/579
   See application file for complete search history.

(56)        References Cited

U.S. PATENT DOCUMENTS 3,474,952 A  * 10/1969 Cover, Jr. ........... B29C 37/0082
                                                     156/272.2
   2006/0072982 A1* 4/2006 Hoarau ................ B42C 9/0006
                                                        412/8

OTHER PUBLICATIONS

Search Report of EP Application No. 14150002.5 dated May 22, 2015.

* cited by examiner

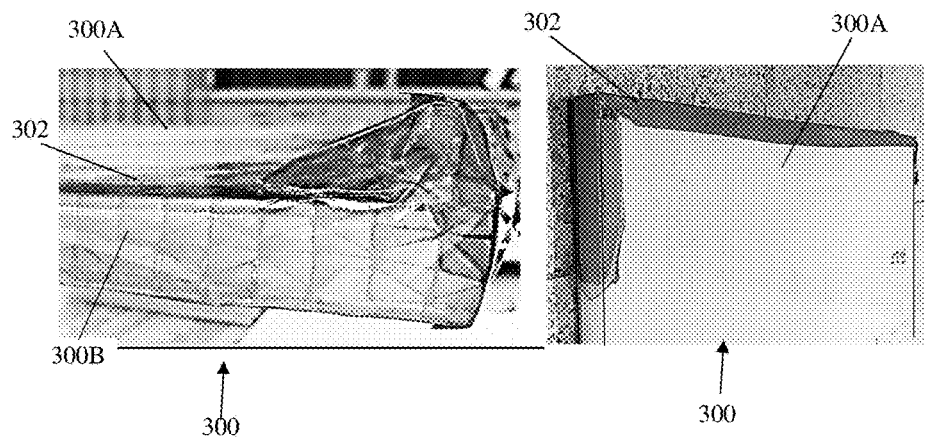
Fig. 3A          Fig. 3B
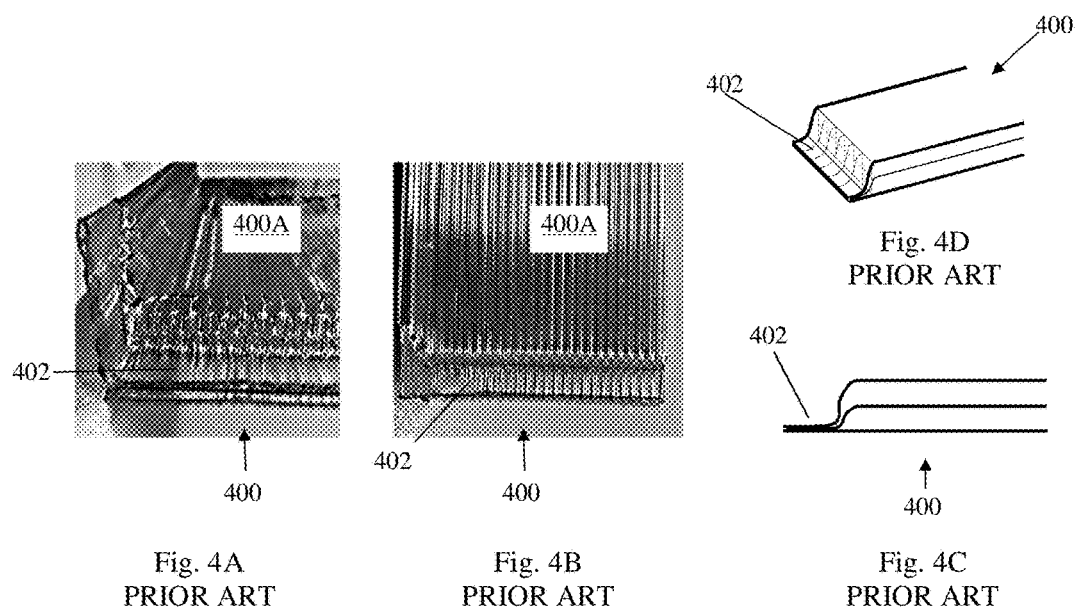
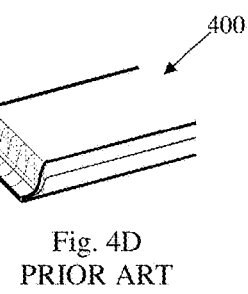
Fig. 4D
PRIOR ART
Fig. 4A
PRIOR ART
Fig. 4B
PRIOR ART
Fig. 4C
PRIOR ART

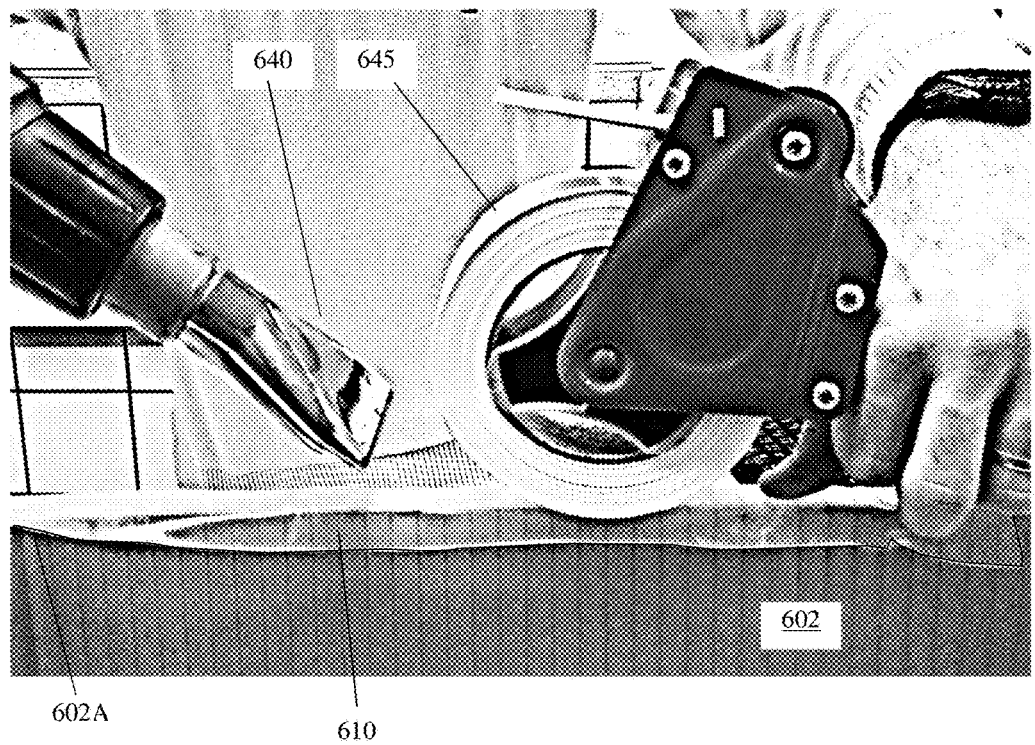
Fig. 6F
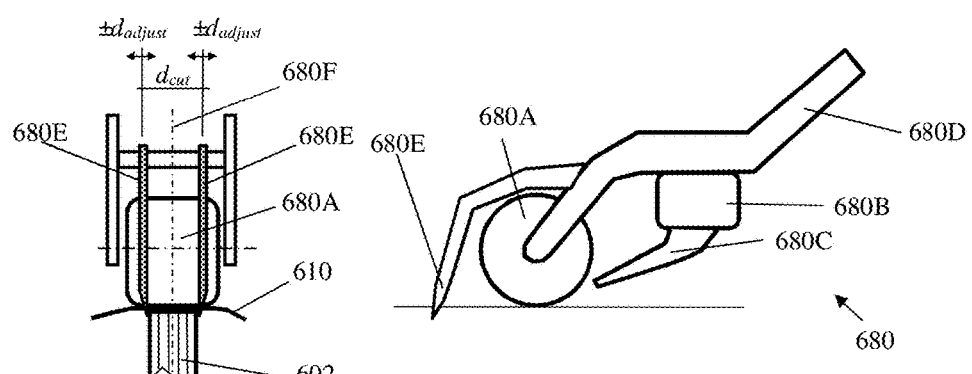
Fig. 6H
Fig. 6G

SYSTEM AND METHOD FOR SEALING OPEN ENDS OF MULTI-WALL SHEETS

CROSS REFERENCE TO RELATED APPLICATIONS

This application claims the benefit of U.S. Provisional Application Ser. No. 61/748,136, filed Jan. 2, 2013, which is hereby incorporated by reference in its entirety.

BACKGROUND OF THE INVENTION

Multi-wall plastic sheets which are widely used for roofing or covering sides of buildings (outdoors) or rooms (indoors) are typically built of two or more plane walls separated by longitudinal ribs which define the space between the walls and define the internal structure. As seen in FIG. 1A, the ribs 11 of multi-wall sheet 10 may be formed vertically to the plane of the sheets (12) or in various angles other than right angle (14). Cross-section that is made vertically to the plane of the walls and to the direction of the ribs may reveal several patterns of sheets and ribs as seen in FIG. 1B, such as ribs that are parallel to each other (20B), ribs that are inclined in certain angle to each other (20A, 20C, 20D, 20E) ribs spaced apart from each other in different distances, etc. In common, the ribs define subspaces enclosed between two adjacent walls and two adjacent ribs (22A, 22B, 22C, etc.). These multi-wall sheets may be produced in various methods, such as extrusion.

Typically multi-wall sheets are produced as a 'running' sheet having width usually defined by the production ability of the producing machine, a length that is dictated by certain industrial/professional standard lengths that fit, for example, the sheets conveying means, the storing capabilities, customer's demands, etc. The multi-wall sheets have two ends, typically the narrow ends, which are perpendicular to the longitudinal direction of the ribs, open where the subspaces defined between adjacent walls and adjacent ribs are opened to the ambient at both ends of the respective multi-wall sheet as-produced.

Open ends of multi-wall sheets, as described above, cause undesired phenomena because these openings tend to enable penetration of dirt, insects, flies, rain, moisture, etc., into the sub-spaces. FIG. 2A depicts dirt, fungus and moss 200A created and/or accumulated at the end of a multi-wall sheet 200 due to accumulation of moisture and dirt that penetrated through the open end of multi-wall sheet 200. FIG. 2B depicts an insect or fly 200B trapped inside one sub-space of a multi-wall sheet 200 after having entered the subspace through an open end of multi-wall sheet 200. Even when measures known in the art are taken to seal the sheet's open ends according to known methods, these sealing means do not offer good enough solution. Such known methods include, for example, use of general-purpose adhesive tape, such as adhesive tape 302 of FIGS. 3A and 3B, adhered over sub-spaces 300B of multi-wall 300A, as seen in FIG. 3A and FIG. 3B.

Another method known in the art is pressing together the ends of a multi-wall sheet 400 along the edge at which sub-spaces end, so as to form a pressed-together end 402, as seen in FIGS. 4A, 4B, 4C and 4D. The performing of this press typically requires use of a special machine, involving applying high pressure and heat. This method may provide a good and durable sealing, but it may not be used on-site, for example for sealing an end formed after the sheet was cut-to a measure. Furthermore, sealing the ends of a multi-wall sheet this way changes the shape of the treated edge, thus interfering with commonly used auxiliary installation elements, such as frame profiles. Moreover, whenever a multi-wall is cut on-site of installation, for example, to fit to its location/role, along line that is perpendicular to the ribs, the sealing that was pre-made is lost and may not be resumed on site.

There is a need for a system and a method for sealing open ends of multi-wall sheets in a way that will provide high-quality, esthetic/elegant sealing that will not change the profile of the sheet at the sealed end, that will be durable during installation and in long usage terms and will be adapted to be carried outdoors at any site, away from the production line, where such multi-wall sheets are commonly used.

SUMMARY OF THE INVENTION

According to some embodiments of the present invention, a device for sealing an open end of a multi-wall sheet is disclosed, the device comprising means for adhering a sealing tape onto the open end of the multi-wall sheet and means for removing edges of said sealing tape protruding outside of the walls of said multi-wall sheet. The means for adhering the sealing tape comprise at least one from a list including pressure applying means and heat applying means. The pressure applying means may be a pressure plate or pressure roller. The heat applying means may be hot-air means for heating by means of hot air and heating filament means for heating by way of radiation. The means for removing edges of the sealing tape protruding outside of the walls of the multi-wall sheet may comprise at least one cutting blade. According to some embodiments of the present invention, the location of the cutting blade with respect to a central imaginary axis of the sealing device may be adjustable so as to place the cutting blade closer to or farther from the central axis. The distance between two cutting blades may be adjustable to a distance equal substantially to a width of the multi-wall sheet. According to some embodiments of the present invention, the open-end sealing device may be operated by a single hand.

A method for sealing an open end of a multi-layer sheet according to some embodiments of the present invention is disclosed, the method comprising providing a multi-layer sheet, providing a sealing tape the width of which is equal to or larger than the thickness of the multi-layer sheet, adhering the sealing tape onto the open end of the multi-layer sheet by applying a pressure onto the sealing tape onto the open end and/or applying heat to the sealing tape so as to adhere the sealing tape onto the open end of the multi-layer sheet, and removing protruding edges of said sealing tape. The heat may be provided using heat applying means selectable from a list including hot air means for heating by way of convection and heating filament means for heating by way of radiation. The removal of protruding edges of the sealing tape may be done using cutting blades. According to some embodiments of the present invention, the application of the sealing tape and the removal of protruding edges may be done by a single hand using a device according to some embodiments of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 3A and 3B depict a prior-art non-durable method of multi-wall end sealing;

FIGS. 4A-4D depict a prior art method of multi-wall sealing involving change of the sheet profile;

FIG. 6F depicts applying of a sealing tape to an open end of a multi-wall sheet manually, according to some embodiments of the present invention;

FIGS. 6G-6H schematically present a manual device for applying, on-site, pressure and heat to a sealing tape, according to some embodiments of the present invention;

Figure 1A:
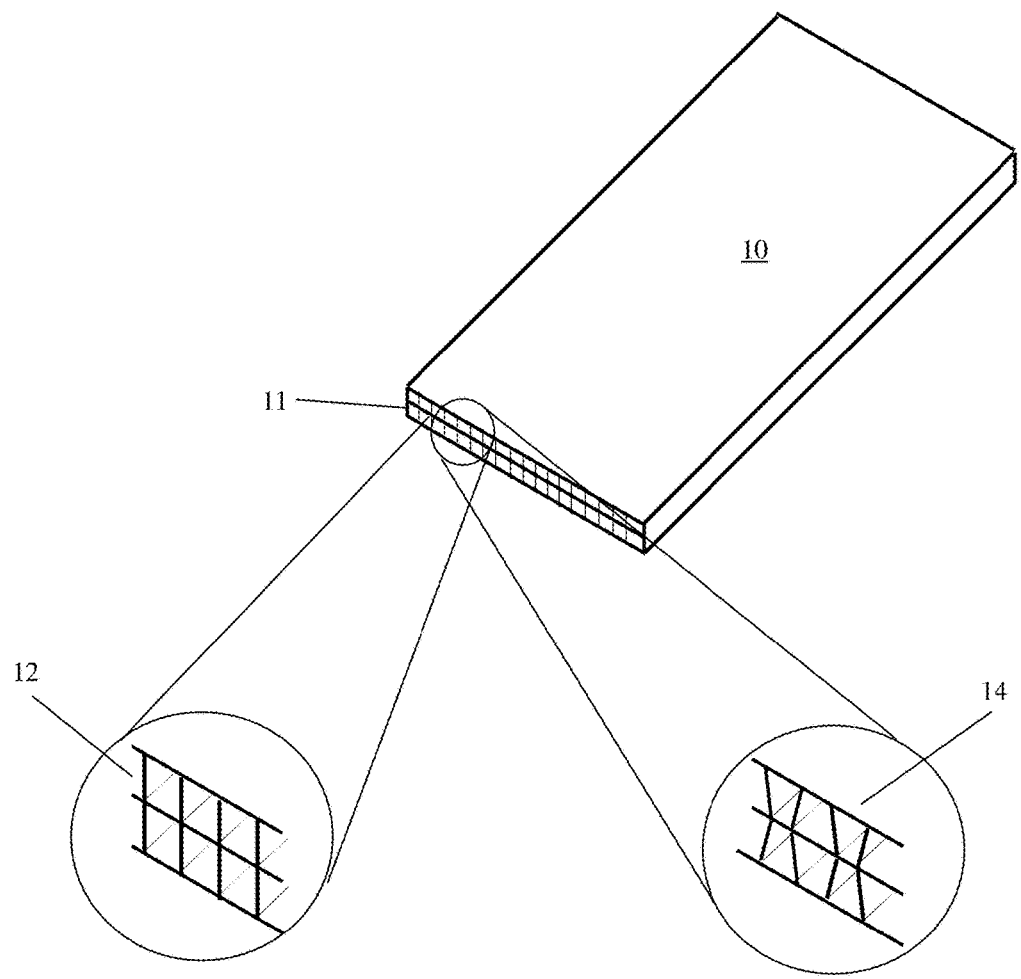
FIGS. 1A and 1B depict prior art multi-wall sheets.
Figure 1B:
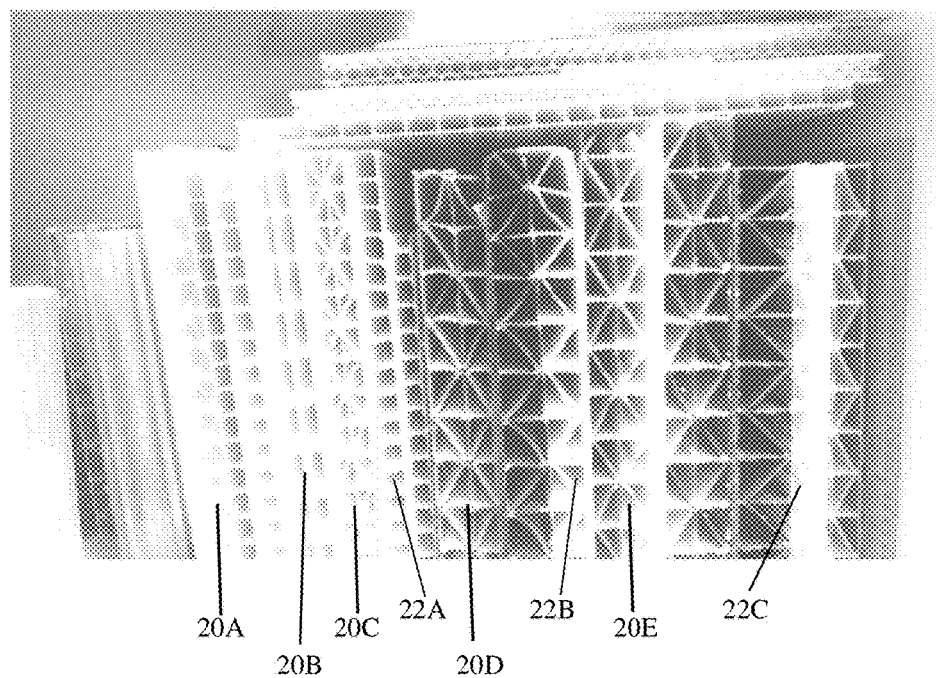
Figure 2A:
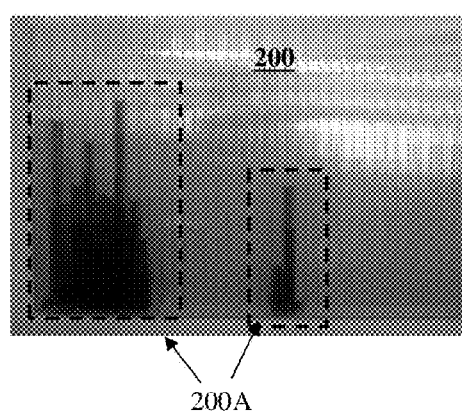
FIGS. 2A and 2B are samples depicting dirt, fungus and moss created at the end of a prior-art multi-wall sheet due to accumulation of moisture and dirt.
Figure 2B:
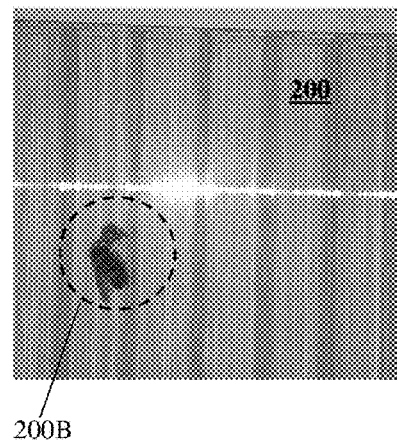

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 5A:
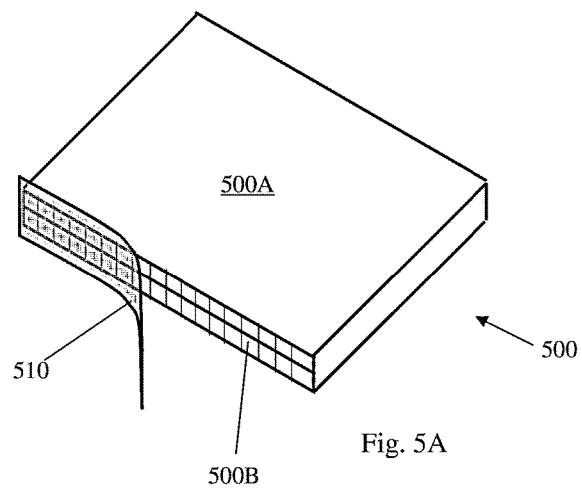
FIGS. 5A, 5B and 5C depict method of sealing open ends of sub-spaces of a multi-wall sheet, according to some embodiments of the present invention.
Figure 5B:
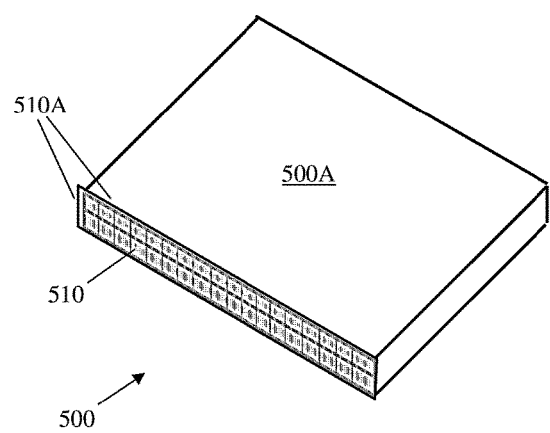
Figure 5C:
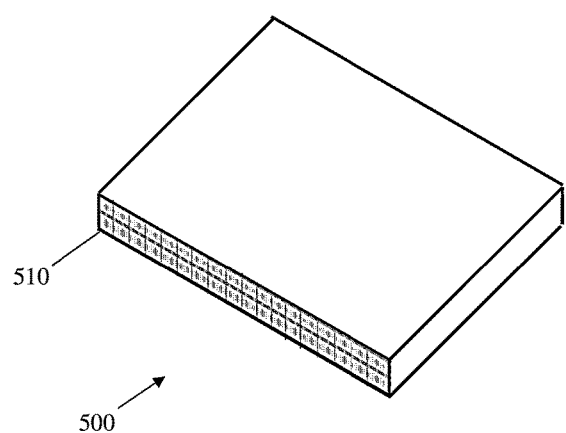

Reference is made now to FIGS. 5A, 5B and 5C which depict a method of sealing open ends of sub-spaces 500B of a multi-wall sheet 500A, according to some embodiments of the present invention. As seen in FIG. 5A, at least one open end of sub-spaces 500B of a multi-wall sheet 500A may be covered with tape 510, herein after called 'sealing tape 510'. Sealing tape 510 may be longer than the length of the sheet end that needs to be covered and wider than its width. Sealing tape 510 may be made of materials such as EMA (Ethylene Methyl Acrylate), EVA (Ethylene Vinyl Acetate) and other materials that demonstrate high adhesion to Polycarbonate (PC). The sealing material may have adhesive layered on one of its faces for directly adhering to the multi-wall sheet. In a different embodiment, the sealing material may contain chemical groups in various concentrations with adhering properties to the multi-wall sheet. This adhesion can be encouraged by applying heat or by the suitable selection of the concentration of the side groups (MA in EMA or VA in EVA) in the PC, where side groups here refer to chemical groups which chemically connected to the backbone chain (main chain) of the polymer. A tape of material with adhesion to the multi-wall sheet can be used itself as the sealing tape or as an adhesive layer between the ends of the multi-wall sheet and the sealing tape, which may be made of another material/polymer. According to some embodiments of the present invention, sealing tape 510 may be made to be adjoined, be joined, be weld or otherwise adhered to the open ends of multi-wall sheet 500A.

Sealing tape 510 may have features such as elasticity, thermo-plasticity, compatibility with thermo-plasticity of the multi-wall and good adhesion to the multi-wall sheet, low Tg (Glass transition temperature) compared to that of the sealed multi-wall sheet, and high thermal stability. According to some embodiments of the present invention, sealing tape 510 may have a flexibility figure of less than 90 in the Shore A hardness scale and may have an adhering strength to the multi-wall sheet of no less than 0.5 N/cm. Sealing tape 510 may be made of a single or multi-layer of polymeric material. According to some embodiments, sealing tape 510 may be made of two layers, first layer of an elastic polymer having a thickness of no less than 100 micron, and a second layer with less flexibility than the first layer and a thickness smaller than the thickness of the first layer by at least 20 percent. Sealing tape 510 may be applied onto open ends of sub-spaces 500B using adhesive and/or heat to urge thermoplastic adhering and/or pressure to firmly adhere sealing tape 510 onto open ends of sub-spaces 500B. According to some embodiments, sealing tape 510 may be submerged, partially or fully, into the open ends of sub-spaces 500B of multi-wall sheet 510A.

Once the adhering of sealing tape 510 onto the open ends 500B of sub-spaces of multi-wall sheet 510A has been completed, as seen in FIG. 5B, the residual margins of sealing tape 510 may be removed, leaving the ends of sub-spaces of sheet 500A firmly and smoothly sealed, without changing the form of the respective end of sheet 500A, as depicted in FIG. 5C. In some embodiments, adhering of sealing tape 510 onto the side of a multi-wall may be done using an intermediate tape, having adhesive material layered on both sides of the tape, or at least on one of its faces. The intermediate layer may have high adhering features as well as flexibility, transparency, elasticity and the like, as is required from the respective sealing tape.

Figure 6A:
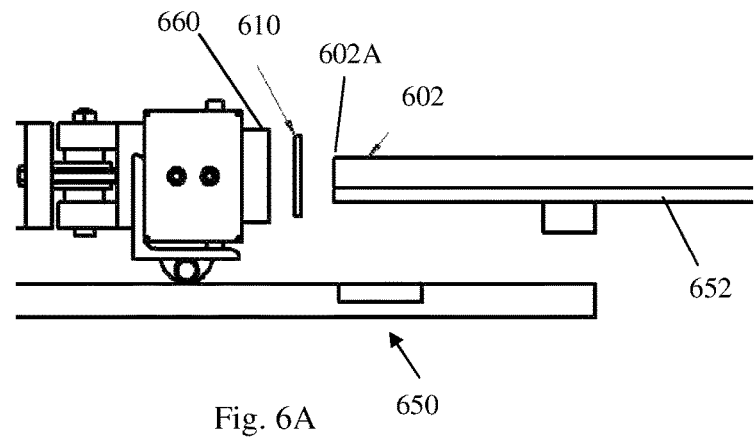
FIGS. 6A-6E depict steps of preparing sealing end at the open end of a multi-wall sheet using proper machinery, according to some embodiments of the present invention.
Figure 6B:
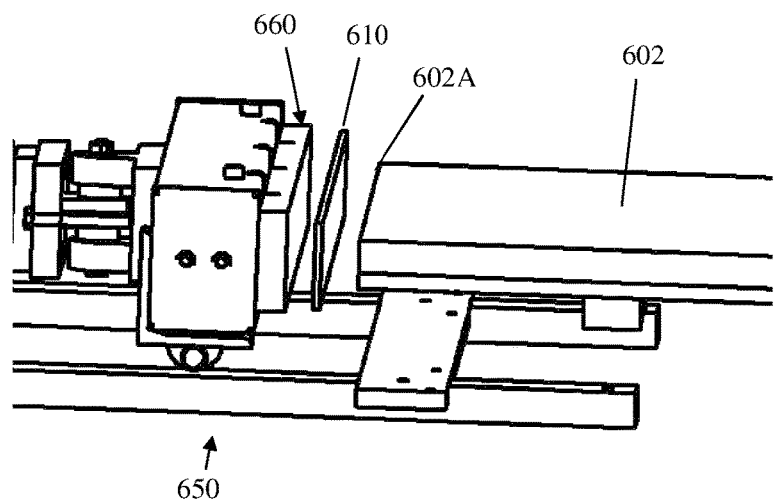
Figure 6C:
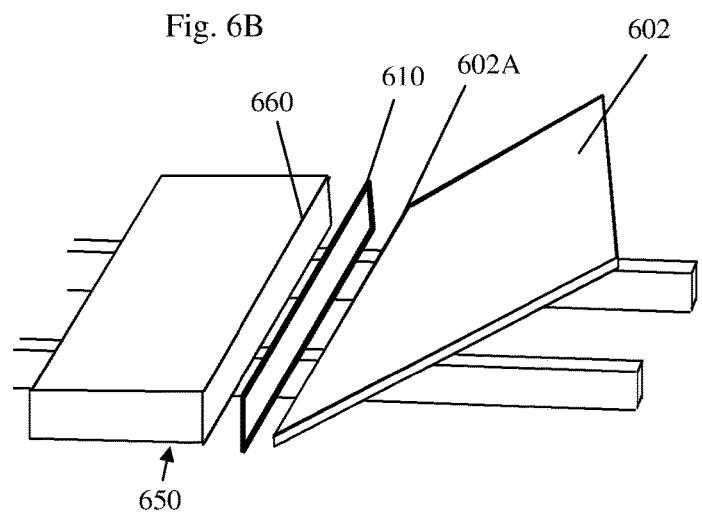
Figure 6D:
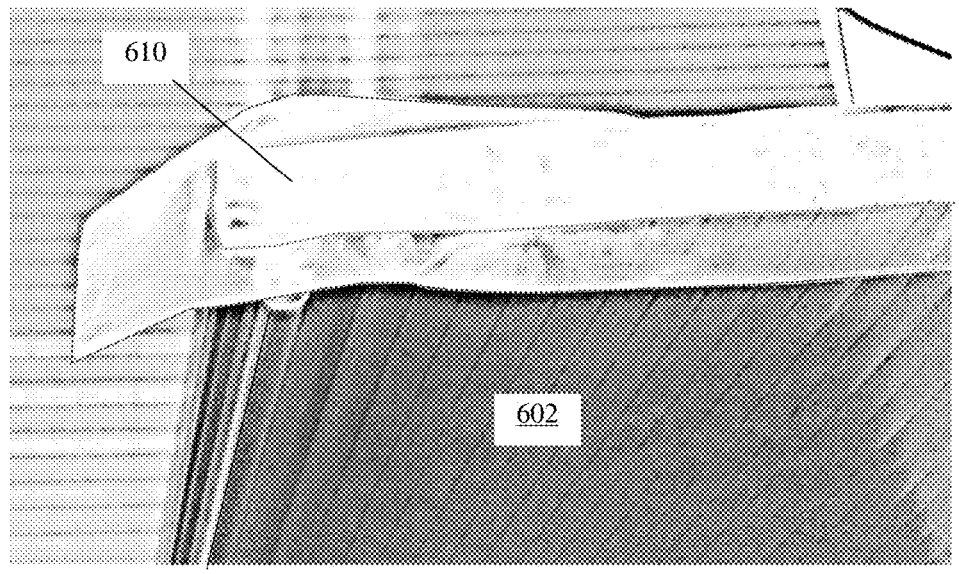
Figure 6E:
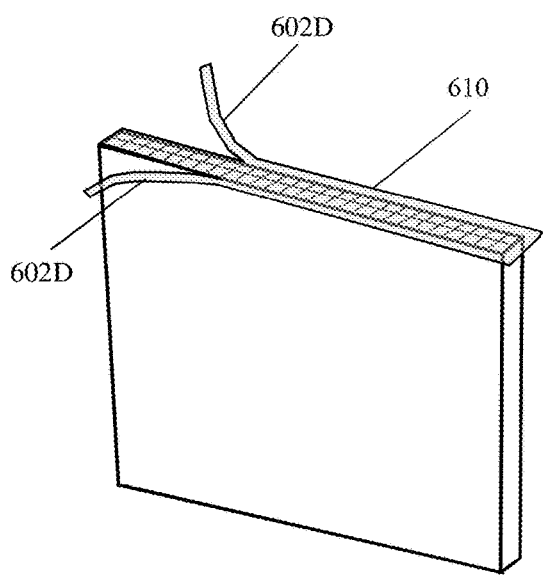

According to some embodiments of the present invention, application of a sealing tape onto the open end of a multi-wall sheet may be performed using machinery, for cutting the sheet to the required size and form, for attaching the sealing tape onto the open ends of the multi-layer sheet and for adhering it to the sheet and removing protruding ends of the tape. Reference is made now to FIGS. 6A-6E, which depict steps of preparing sealing end at the open end of multi-wall sheet 602 using proper machinery, according to some embodiments of the present invention. Multi-wall sheet 602 may be placed in a suitable machine 650, equipped with work plane 652 and at least one pressing plane 660 adapted to press onto and/or to provide heat to a sealing tape in order to adhere it to an open end of multi-wall sheet 602 as seen in FIG. 6A. A sealing tape 610 may be located along a certain open end 602A of sheet 602 (FIG. 6B), and machine 650 may be operated to apply pressure, and optionally heat, onto sealing tape 610, even if the sealed end is cut in an angle other than right angle with respect to other edges of sheet 602, as seen in FIG. 6C. As a result of the pressure, and optionally heat, that are applied to sealing tape 610, sealing tape 610 is firmly adhered onto the open end of sheet 602, as seen in FIG. 6D. All that is left to do now is the removal of the protruding ends 602D of tape 610 beyond the edges of sheet 602, as seen in FIG. 6E. As described above, this method is suitable for preparation of sealing to open ends of multi-wall sheet that are cut to a measure in the factory. In several cases multi-wall sheet are cut to measure on-site, where machine such as machine 650 are not available.

Reference is made now to FIG. 6F, which depicts applying of sealing tape 610 to an open end of multi-wall sheet 602 on-site where the multi-wall sheet is to be installed, according to some embodiments of the present invention. As seen in FIG. 6F, sealing tape 610 is first placed against the respective open end 602A of multi-wall sheet 602, and then sealing tape 610 is heated by heater 640 (in cases where the adhering is heating dependent) and pressure may also be applied onto sealing tape 610 (in cases where the adjoining or adhering is pressure-dependent) using pressure-applying device, such as manual pressure roller 645. By this method, sealing tape 610 may be adhered, welded, adjoined and the like, along any desired end of plate 602. The advantage of this method for on-site sealing is evident. The heating can be applied on both sides of the sealing tape (top and bottom). It will be apparent to one skilled in the art that the method of joining, adhering, adjoining or adhering of a sealing tape on-site according to some embodiments of the present invention may also be carried out using on-site compatible light machinery that may assist in, or perform instead of a worker, some or all of the steps described above.

Reference is made now to FIGS. 6G and 6H schematically presenting, in front view and partial side view respectively, manual device 680 for applying by a single hand, on-site of the place where the multi-layer is to be installed, pressure and heat to a sealing tape, according to some embodiments of the present invention, in order to adhere that sealing tape onto an open end of a multi-wall sheet as described above with regard to FIG. 6F. Manual device 680 may comprise pressure roller 680A, air heater unit 680B, hot air duct 680C, one or two edge removing cutting blades 680E and manual handle 680D, all connected together to allow an operator of device 680 to conveniently apply pressure and heat to a sealing tape such as sealing tape 610 so as to adhere said sealing tape onto an open-end of multilayer sheet such as sheet 602 and to remove protruding edges. The distance $d_{cut}$ between the two cutting blades 680E may be adjustable so as to adapt to the width of multi-wall sheet 602. Each one of cutting blades 680E may be moved left or right (as seen in the side view of FIG. 6H) by $\pm d_{adjust}$ amount of movement to enable convenient setting of the location of the cutting blades with respect to an imaginary longitudinal central axis 680F located substantially in the middle of the side view seen in FIG. 6H. According to some embodiments of the present invention, setting of the desired magnitude of $d_{cut}$ may be done by separate setting of the $d_{adjust}$ of the location of each of cutting blades 680E.

Figure 7A:
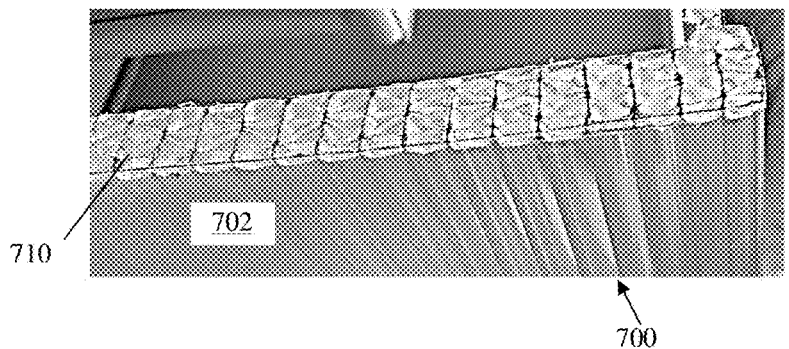
FIGS. 7A, 7B and 7C depict various views of edges of a multi-wall sheet sealed with a sealing tape according to some embodiments of the present invention.
Figure 7B:
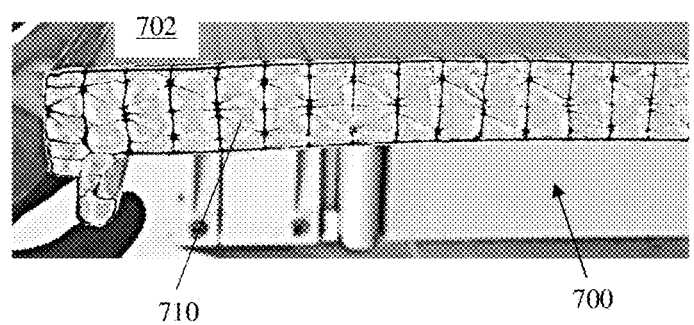
Figure 7C:
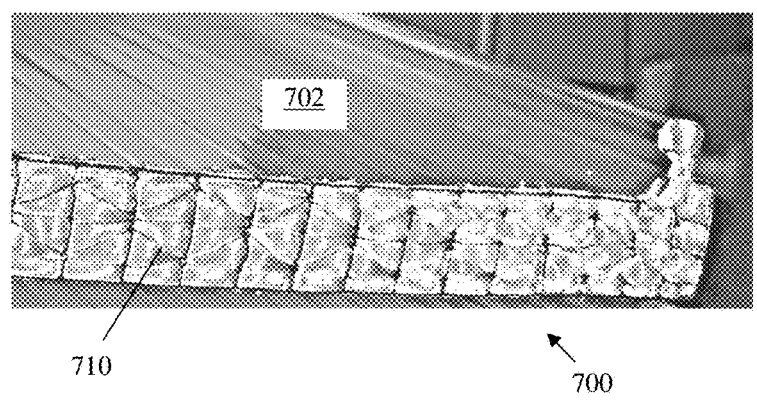

Reference is made now to FIGS. 7A-7C, which depict various views of edges of multi-wall sheet 702 sealed with sealing tape 710 according to some embodiments of the present invention.

Sealing tape according to some embodiments of the present invention, such as sealing tapes 610, 710, may be made of flexible tape having width and thickness as may be required and in lengths as required. The tape may be transparent, semi-transparent or opaque, with natural color or in any other color—as may be desired. The material of which the sealing tape is made may be, for example, EVA (Ethylene Vinyl Acetate) with various concentrations of VA (Vinyl Acetate). The sealing tape may, for example, have adhesive features that will enable good adhering to the open ends of a multi-wall sheet, depending, for example, on the material of which the multi-wall sheet is made. For example, a multi-wall sheet made of polycarbonate may require that its sealing tape will be compatible and with good adhesion to PC, thermoplastic and elastic. The sealing tape may have other features and may be made of other materials, such as EMA (Ethylene Methyl Acrylate), with various concentrations of MA (Methyl Acrylate) and TPU (Thermoplastic Polyurethane).

Figure 8:
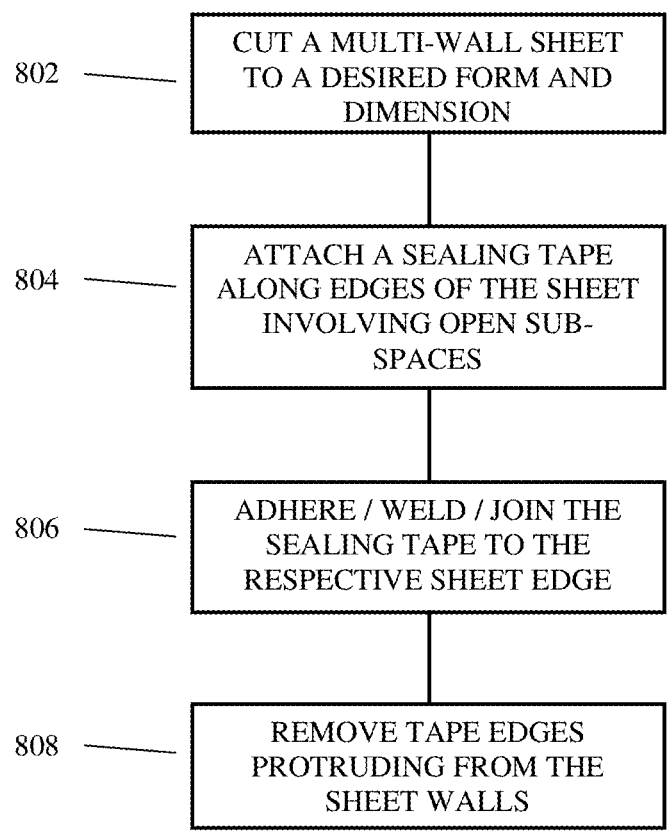
FIG. 8 describes schematically a method of sealing open ends of a multi-wall sheet, according to some embodiments of the present invention.

Reference is made now to FIG. 8, which describes schematically a method of sealing open ends of a multi-wall sheet, according to some embodiments of the present invention. A multi-wall sheet is cut to a desired measure and form, either at the factory or on-site where it will be used (block 802). A sealing tape is attached to the open ends of the multi-wall sheet (block 804). The attached sealing tape is pressed into the open ends of the multi-wall sheet and adhered/welded/glued/adjoined and the like, whether with a stationery machine (off-site) or with a manual/on-site compatible tool (on-site) (block 806). The process can be done in hot or cold method. After the sealing tape was pressed and adhered the tape edges protruding are removed (block 808).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for sealing an open end of a multi-layer sheet comprising:
   providing a multi-layer sheet;
   providing a sealing tape, the width of said sealing tape is equal to or larger than the thickness of said multi-layer sheet, wherein the sealing tape is made from a thermoplastic material;
   thermo-plastically adhering said sealing tape into said open end of said multi-layer sheet by at least heating said sealing tape to a temperature above the Glass transition temperature of the sealing tape's material, so as to submerge said sealing tape into said open end of sub-spaces in said multi-wall sheet, wherein thermo-plastically adhering said sealing tape into said open end results in sealing of said open end; and
   removing protruding edges of said sealing tape when said edges are protruding from said open end.

2. The method of claim 1, further comprising providing pressure to said sealing tape using one from a list including a pressure plate and a pressure roller.

3. The method of claim 1 wherein said heating is to be provided using heat applying means selectable from a list including hot air means for heating by means of hot air and heating filament means for heating by way of radiation.

4. The method of claim 1 wherein said removing of protruding edges is achievable using at least one cutting blade.

5. The method of claim 4 further comprising adjusting the location of said at least one cutting blade to remove said protruding edges of said sealing tape adjacent to an outer wall of said multi-wall sheet.

6. The method of claim 1, wherein adhering said sealing tape and removing protruding edges are performed by a single hand.

* * * * *